No. 851,502. PATENTED APR. 23, 1907.
D. J. DEYO.
AUTOMOBILE SHIELD.
APPLICATION FILED JAN. 7, 1907.
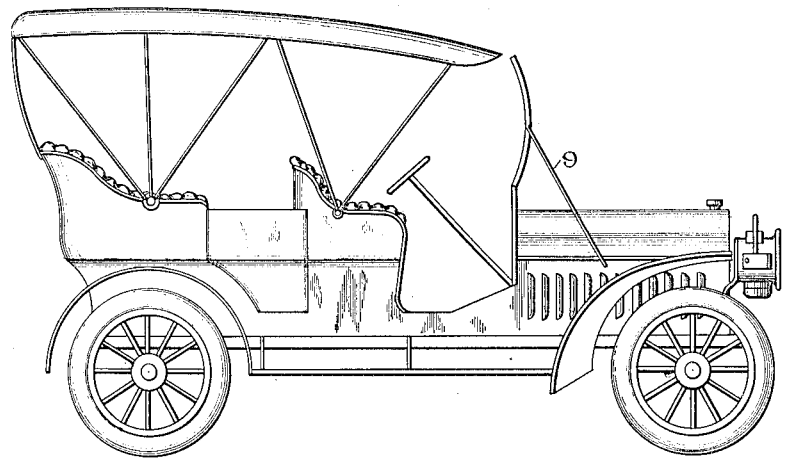
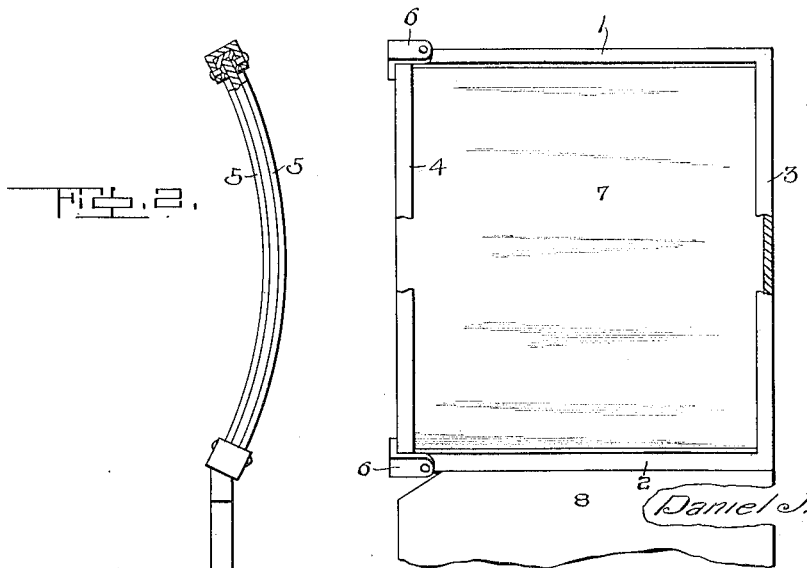

UNITED STATES PATENT OFFICE.

DANIEL J. DEYO, OF VINELAND, NEW JERSEY.

AUTOMOBILE-SHIELD.

No. 851,502.     Specification of Letters Patent.     Patented April 23, 1907.

Application filed January 7, 1907. Serial No. 351,174.

*To all whom it may concern:*

Be it known that I, DANIEL J. DEYO, a citizen of the United States, residing at Vineland, in the county of Cumberland and State of New Jersey, have invented new and useful Improvements in Automobile - Shields, of which the following is a specification.

The invention relates to an improvement in protective shields for moving vehicles, and particularly to a dust and wind shield for automobiles.

The main object of the present invention is the production of a transparent shield, as a glass or the like curved in longitudinal plane to avoid to a material extent the pressure of the air exerted against the shield, during travel of the vehicle, as such shields are usually constructed.

The invention will be described in the following specification, reference being had particularly to the accompanying drawings, in which:—

Figure 1 is a view in side elevation of an automobile provided with my improved shield. Fig. 2 is a longitudinal section of the same, the securing plate being in elevation. Fig. 3 is a rear elevation of the same.

Referring particularly to the drawings my improved shield comprises a metallic frame including end bars 1 and 2 and side bars 3 and 4. The end bars 1 and 2 and the side bar 3 are of U-shape in transverse section to provide for snugly receiving the shield proper, while the side bar 4 comprises two spaced members or strips 5, between which the shield proper is inserted into the frame. U-shaped clips 6 are pivotally connected to the upper and lower or end bars 1 and 2, with the transverse bar of the clips designed to overlie the space between the plates 5.

The shield proper 7 comprises a plate glass curved in longitudinal plane, as clearly shown in Figs. 1 and 2, the curvature being uniform throughout the length of the shield and being of such a radius as to direct the material contacting with the shield above or below the same. The main frame is, of course, curved throughout the length of the side bars 3 and 4 to conform to the curvature of the shield proper, and the shield is inserted in the frame by passing the latter between the plates 5 of the side bar 4, the movement of the shield being continued until the respective edges thereof are seated in the respective U-shaped frame bars. The clips 6 are then turned into position to prevent accidental disengagement of the shield from the frame.

Integrally with the main frame and depending therefrom is an attaching plate 8, preferably plane, as shown, and designed to be secured to the appropriate portion of the automobile, it being understood in this connection that the plate 8 is so formed as to provide for its engagement with the desired portion of the automobile.

If desired the main frame may be braced by brace bars 9 to prevent its displacement by the pressure of the air, and the main frame is of such a length as to dispose the upper end of the shield proper immediately adjacent the upper forward end of the canopy top of the automobile. By this arrangement all material contacting with the shield in the travel of the automobile will be directed rearwardly above and over the canopy top, thereby thoroughly protecting the occupants.

Having thus described the invention what is claimed as new, is:—

An automobile shield comprising a main frame adapted to be secured to the automobile structure; a section of glass curved throughout its longitudinal plane and straight throughout its transverse plane, and clips carried by the main frame and adapted to be turned to overlie the edge of the glass section when the latter is in place in the frame.

In testimony whereof, I affix my signature in presence of two witnesses.

DANIEL J. DEYO.

Witnesses:
   L. E. KEMMERER,
   J. P. ASHWORTH.